April 24, 1956 L. B. M. BUCHANAN 2,742,766
THERMOSTATIC ACTUATOR FOR REFRIGERATOR CONTROLS
Filed Nov. 14, 1952 3 Sheets-Sheet 1

INVENTOR
LESLIE B.M. BUCHANAN
BY
ATTORNEY

April 24, 1956 L. B. M. BUCHANAN 2,742,766
THERMOSTATIC ACTUATOR FOR REFRIGERATOR CONTROLS
Filed Nov. 14, 1952 3 Sheets-Sheet 2
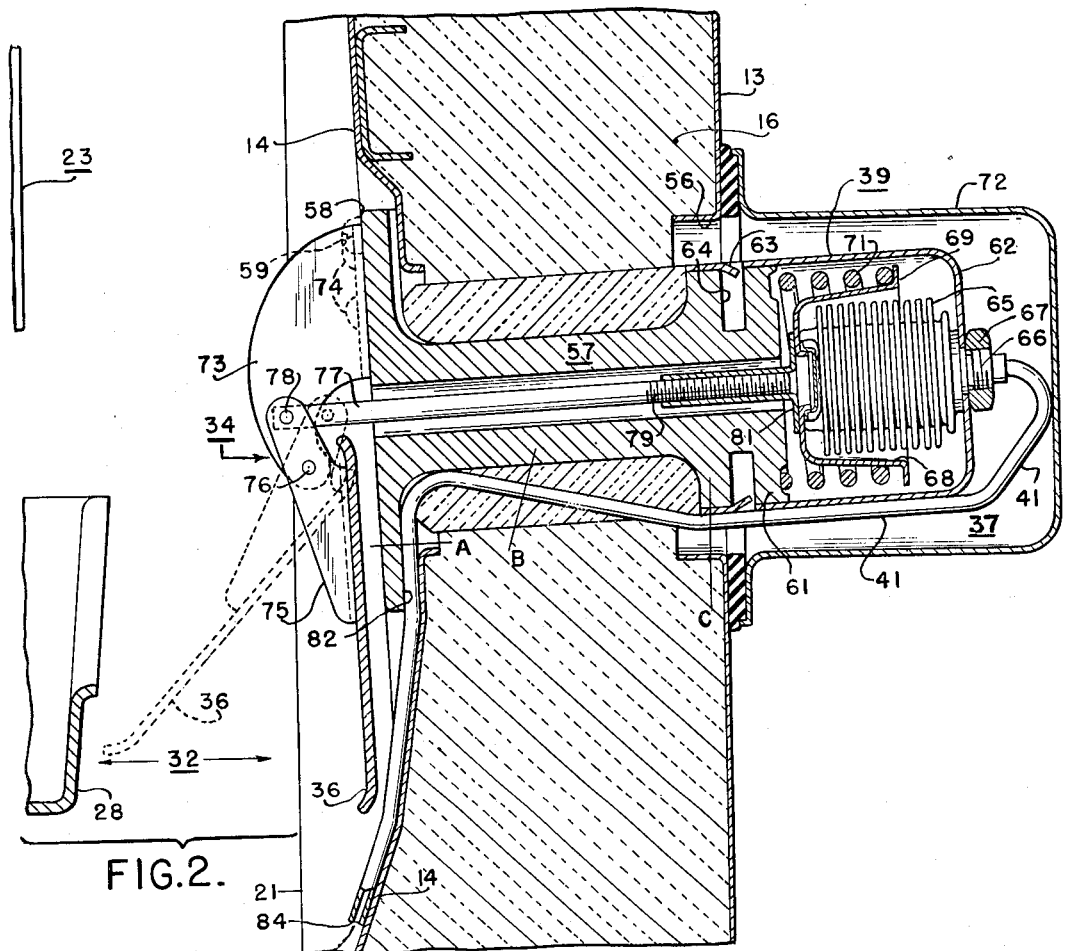
FIG.2.
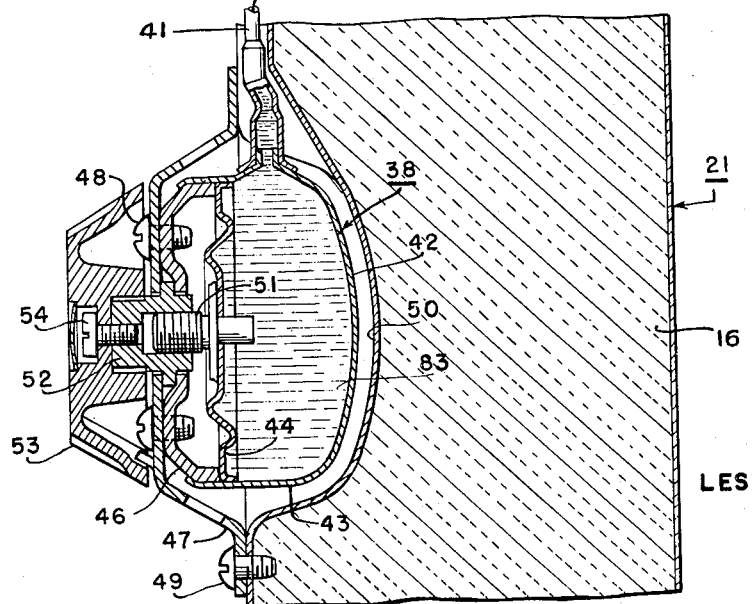
INVENTOR
LESLIE B. M. BUCHANAN
BY
ATTORNEY April 24, 1956  L. B. M. BUCHANAN  2,742,766
THERMOSTATIC ACTUATOR FOR REFRIGERATOR CONTROLS
Filed Nov. 14, 1952  3 Sheets-Sheet 3

INVENTOR
LESLIE B.M. BUCHANAN
BY
ATTORNEY

United States Patent Office 2,742,766
Patented Apr. 24, 1956

2,742,766

THERMOSTATIC ACTUATOR FOR REFRIGERATOR CONTROLS

Leslie B. M. Buchanan, Wilbraham, Mass., assignor to Westinghouse Electric Corporation, East Pittsburgh, Pa., a corporation of Pennsylvania Application November 14, 1952, Serial No. 320,568

8 Claims. (Cl. 62—6)

This invention relates to refrigeration apparatus and more particularly to thermostatically actuated control devices for domestic refrigerators.

It is well known in the art that two distinct temperature zones may be maintained within a baffled chamber using a single cooling unit by controlling the flow of air between the two sections of the chamber. Temperature regulation of the section containing the cooling unit, and generally referred to as the frozen food storage section, is accomplished by cycling the refrigerant circulating machinery for the unit. Control means for regulating the temperature of the other section, generally called the food storage section, frequently takes the form of an air flow damper actuated by a thermostat responsive to the temperature of the food storage section.

One of the principal shortcomings of prior thermostatic control devices of this nature has been the small power output of the thermostat itself. To obtain sufficient power to actuate a damper it has been necessary to permit large temperature fluctuations within the refrigerated space, or to amplify the output of the thermostat by means of electric actuators or the like. Neither of these arrangements have proven entirely satisfactory; the former because the food preserving characteristics of the refrigerator are poor and the latter because of its high cost. It is, therefore, one object of this invention to provide a novel thermostat having a greater power output for the actuation of a control device than prior thermostats.

It is a further object of this invention to provide a thermostat capable of actuating a control device through a relatively large range of movement in response to relatively small temperature variations.

I propose to accomplish the aforementioned objects by mounting a volatile fluid thermostat on the refrigerator with the temperature sensitive element disposed within the refrigerated chamber and the motor element disposed exteriorly of the cabinet and in heat exchange relationship with the ambient air. A small bore tube connects the temperature sensitive and motor elements and passes through one of the insulated walls of the refrigerator cabinet such that a portion of the length of this tube is subjected to the temperature gradient existing within the insulated wall. This thermostat assembly is charged with a quantity of volatile fluid sufficient to completely fill the temperature sensitive element and a portion of the connecting tube with liquid. The quantity and pressure of the charge is such that the dividing line between the liquid and vaporous phases of the fluid occurs within the portion of the connecting tube that passes through the insulated wall. Because the connecting tube has a small bore, slight changes in temperature and, consequently, volume of the liquid in the temperature sensitive element results in substantial movement of the liquid-vapor dividing line within the tube. Since the pressure within the motor element is determined by the temperature of the liquid surface at the dividing line, and since this liquid surface moves within the portion of the connecting tube which is subjected to a relatively large temperature gradient, the pressure within the motor element will vary throughout a relatively wide range in response to relatively small changes in temperature of the temperature sensitive element.

Another object of this invention is to provide an improved mounting arrangement for thermostatically actuated control devices for domestic refrigerators.

These and other objects are effected by my invention as will be apparent from the following description taken in connection with the accompanying drawings, forming a part of this application, in which:

Fig. 2 is an enlarged sectional view of the thermostatically-actuated control device of this invention;

Figure 1:
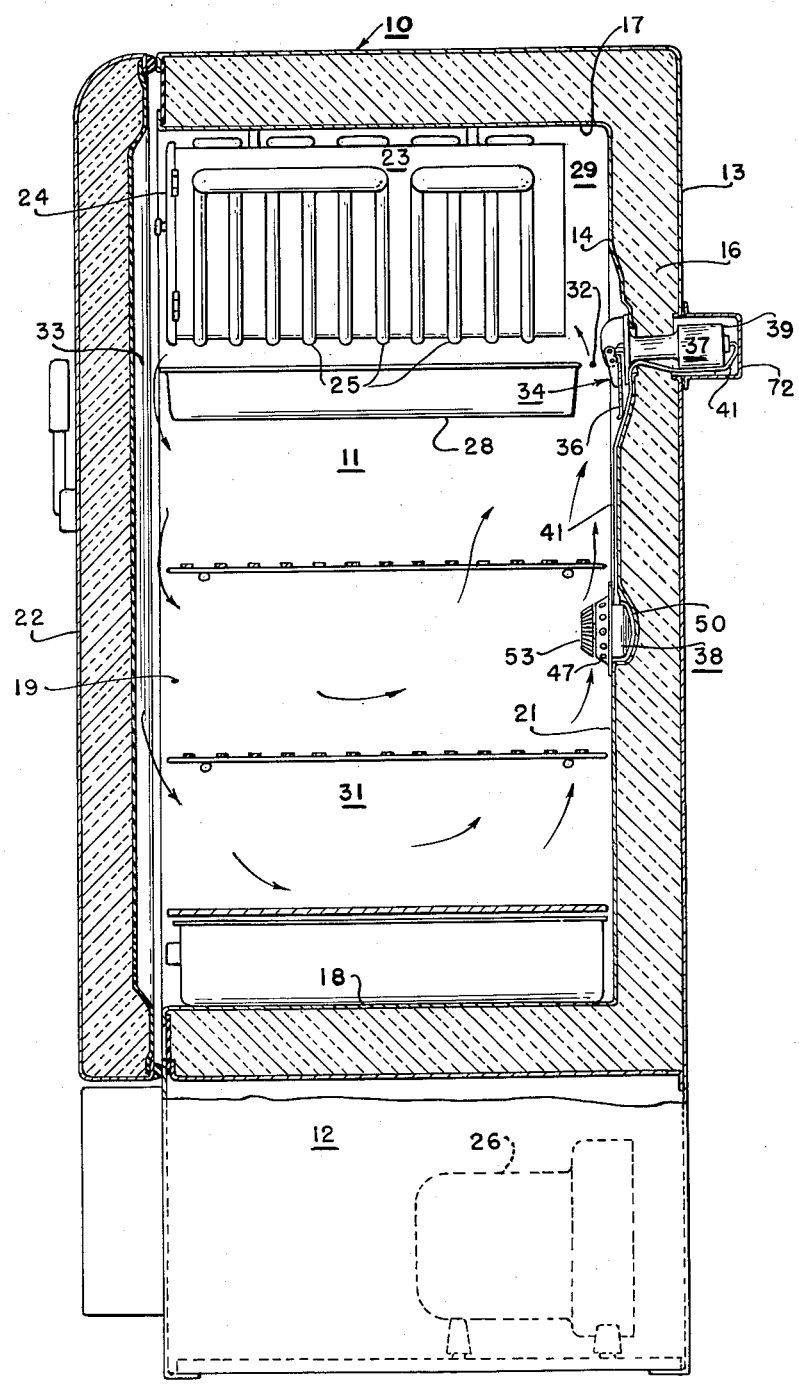
Fig. 1 is a side view of a domestic refrigerator, partially in section, embodying this invention.

Referring to the drawings, the reference numeral 10 designates a refrigerator cabinet having a food storage chamber 11 in the upper portion thereof and a machinery chamber 12 in the lower portion thereof. The food storage chamber 11 is defined by an outer metal shell 13 and an inner metal shell or liner 14 with thermal insulation 16 therebetween, which together make up the top wall 17, bottom wall 18, side walls 19, and rear wall 21 of chamber 11. The front opening of cabinet 10 is closed by an insulated door 22. A suitable cooling unit 23 of the type well known in the art is disposed in the upper portion of the food storage chamber 11. The cooling unit 23 is spaced from the top wall 17, the side walls 19 and the rear wall 21 of the inner liner 14 to provide air circulating passages around the cooling unit 23. The front of the cooling unit 23 is provided with a door 24 which, likewise, is spaced from the door 22 to provide an air passage. Refrigerant is circulated through refrigerant passages 25 formed in cooling unit 23 by suitable circulating machinery 26 located in the machinery chamber 12 in the lower portion of cabinet 10.

Disposed within food storage chamber 11 and spaced beneath cooling unit 23 is an insulated baffle 28 which divides chamber 11 into an upper or frozen food section 29 and a lower or food storage section 31. The baffle 28 extends to the side walls 19 of chamber 11 but is spaced from the rear wall 21 thereof and from the door 22 to provide air passages 32 and 33, respectively.

The heavier cold air adjacent the cooling unit 23 flows downwardly onto baffle 28 which is sloped downwardly toward the front to cause the cold air to flow down through forward air passage 33 into food storage section 31. This cold air leaving the frozen food section 29 is replaced by warmer air from food storage section 31, which air flows upwardly through rear air passage 32 between baffle 28 and the chamber rear wall 21. This circulation of air, as indicated by the arrows in Fig. 1, together with the small heat leakage through baffle 28 cools the food storage section 29 to a temperature of about 40° F., while cooling unit 23 is maintained at a temperature of about 0° F. by the refrigerant circulated therethrough.

The temperature within food storage section 31 can be regulated by controlling the flow of air therethrough. For this purpose I provide a control device 34 in the form of a movable damper 36 disposed in the rear air passage 32 between baffle 28 and chamber rear wall 21 and actuated by a thermostat 37.

Thermostat 37 comprises generally a temperature sensitive element 38 disposed within food storage section 31, a motor element 39 disposed exteriorly of the insulated cabinet 10 and an elongated tube 41 providing communication between temperature sensitive element 38 and motor element 39. Temperature sensitive element 38 consists of a reservoir 42 formed by a cup-shaped metal member 43 and a flexible diaphragm or wall member 44 brazed or soldered within the open end of cup member 43. Also attached to cup member 43 in any suitable manner, as by brazing or soldering, is a mounting cap 46, which, in turn, is attached to a perforated cover member 47 by screws 48. Cover member 47 is attached to the inner liner 14 on the chamber back wall 21 by means of screws 49 and positions reservoir 42 within a recess 50 provided therefor in liner 14. Attached to diaphragm 44 is a stud 51 which is threaded into a nut 52 carried between mounting cap 46 and cover member 47. A knob 53 is carried on the outward end of nut 52 and is held in place thereon by screw 54.

The cabinet 10 is provided with an opening 56 in the rear wall 21 thereof through which the motor element 39 of thermostat 37 is assembled. Disposed within opening 56 is a collar 57 which is preferably formed of a low heat conducting plastic material. Collar 57 has a flange 58 formed at one end thereof for attachment to chamber inner liner 14 by means of screws 59. The opposite end of collar 57 is provided with a grooved flange 61 adapted to support the motor element 39 of thermostat 37.

The thermostatic motor element 39 includes a housing consisting of a cup-shaped container 62 which engages the outer rim of flange 61 of collar 57 and is secured thereto by means of tabs 63 bent therefrom into a groove 64 in flange 61. A cylindrical metal bellows 65 is secured in the cup 62 by means of a threaded stud 66 attached to one wall of bellows 65. The stud 66 projects through an opening in the base of cup 62 and is engaged by a nut 67 on the outer wall of cup 62. The stud 66 has an axial bore (not shown) which provides communication between bellows 65 and the elongated tube 41.

A second cup-shaped element 68 partially surrounds the bellows 65 and bears at its base against the movable wall of bellows 65. The rim of cup 68 is provided with a flange 69 which engages one end of a compression spring 71. The other end of spring 71 bears against the face of flange 61 of collar 57.

Motor element 39 and the portion of tube 41 extending outside of cabinet 10 are protected by a cover 72.

Control device 34 is likewise mounted on collar 57 by means of a bracket 73 secured to the face of flange 58 on collar 57 by screws 74. Movable damper 36 of control device 34 is provided with an arm 75 which is pivotally attached at 76 to bracket 73. An actuating rod 77 pivotally attached at 78 to the end of damper arm 75 extends through the hollow bore of collar 57 and is provided with a threaded end 79 for attachment to bellows cup members 68 by means of a T nut 81.

In accordance with my invention, elongated tube 41 which provides communication between temperature sensitive element 38 and motor element 39 of thermostat 37 has a very small bore 84, the reason for which will hereinafter be discussed. As shown in Fig. 2, tube 41 extends upwardly along the surface of inner liner 14 from reservoir 42, through opening 56 in cabinet rear wall 21, and along collar 57 to bellows 65. Flange 58 of collar 57 is provided with a groove 82 through which tube 41 extends.

The thermostat 37 is charged under controlled pressure and temperature conditions with a quantity of volatile fluid 83 sufficient to completely fill reservoir 42 and that portion of elongated tube 41 located within the food storage chamber 11 with liquid when the temperature within the food storage section 29 is at the lowest value to be maintained. In the ordinary domestic refrigerator, the lowest desirable temperature within the food storage chamber 11 would be approximately 37° F. and in the embodiment of the invention illustrated in Fig. 2 of the drawings, the liquid portion of fluid 83 fills tube 41 to approximately point A. The liquid surface at point A, or, in other words, the dividing line between the liquid and vaporous phases of fluid 83, will hereinafter be referred to as the "liquid front" for the fluid 83.

It is well known that, in ordinary thermostats employing a volatile fluid, the vapor pressure acting on the bellows assembly is a function of the temperature at the surface of the liquid portion of the volatile fluid. It is also known that this liquid portion of the volatile fluid will collect at the coldest portion of the thermostat, which is generally the control bulb. If, however, the temperature-responsive portion of the thermostat comprises an elongated tube containing a substantial quantity of liquid, the vapor pressure available to actuate the bellows of the thermostat will still be determined by the temperature of the front surface of the liquid even though other portions of the liquid-filled tube might have a lower temperature. The thermostatic means of this invention utilizes this principle of liquid front temperature control to secure large variations in the vapor pressure acting on the bellows from relatively small variations in the temperature to which the control bulb of the thermostat is subjected.

*Operation*

As best shown in Fig. 2 of the drawings, the liquid-filled reservoir 42 and the liquid-filled portion of tube 41 are supported on the inside of insulated rear wall 21 of the refrigerator cabinet 10. The openings in the reservoir cover member 47 permit the air circulating within the food storage section 31 to flow over and around the reservoir 42. The liquid in the reservoir 42 is, consequently, maintained at substantially the same temperature as the air circulating within the food storage section 31.

With an increase in temperature of the air within food storage section 31, such as might result from the addition of warm foodstuffs into this section, there will likewise be an increase in temperature of reservoir 42 of thermostat 37. The liquid fluid within reservoir 42 expands in proportion to this increase in temperature and forces the liquid in elongated tube 41 toward the motor element 39. The liquid front of fluid 83 formerly at point A now assumes a new position within tube 41 at some point B.

There exists between the outer shell 13 and the inner shell 14 a temperature gradient through insulated wall 21. The degree of this gradient is determined by the relative temperatures within and without the insulated cabinet structure 10. For the purpose of this illustration it may be assumed that average conditions for a domestic refrigerator exist and that the temperature to be maintained within food storage section 31 is approximately 40° F. and the air temperature ambient the cabinet is 65° F. The temperature gradient through insulated wall 21 is, therefore, 25 degrees F. from the outside to the inside with portions of insulated wall 21 assuming intermediate temperatures between 50° F. and 65° F.

It will thus be apparent that the liquid front within tube 41 in moving from point A to point B moves into a higher temperature region of insulated wall 21. A portion of the liquid at point B will, therefore, be vaporized to increase the pressure acting within bellows 65 to a value corresponding to the vapor pressure of the fluid 83 at point B. Bellows 65 expands, compressing spring 71 and acting through rod 77 to open damper 86 from its dotted line position of Fig. 2.

Further increases in temperature of reservoir 42 would cause the liquid therein to expand more, eventually forcing the liquid front within tube 41 to location C within insulated wall 21. The resulting increase in vapor pressure acting within bellows 65 would eventually open damper 36 to the fully opened or full-line position of Fig. 2.

The amount of movement of the liquid front for any given change in temperature of fluid 83 is determined by the size of the bore 84 of tube 41. The bore 84 is preferably small to effect substantial movement of the liquid front with slight changes in temperature of the fluid 83.

Full utilization of the temperature gradient existing in insulated wall 21 can be obtained by constructing tube 41 of relatively poor heat conducting material. Since, for practical reasons, the tube 41 is more easily made of metal it is preferable that the material be brass or steel rather than copper. The poorer conducting material reduces the tendency for heat to flow along the tube and lessen the effect of the temperature gradient in wall 21.

With a properly proportioned system, a temperature variation of 20° F. within food storage section 31 will be sufficient to move the liquid front within tube 31 throughout its full range between points A and C. It will of course be understood that the liquid front within tube 41 may assume an infinite number of positions between points A and C depending upon the temperature of reservoir 42 and there would be a corresponding infinite number of positions of the damper 36 between its fully closed and fully opened positions.

As the temperature within food storage section 31 is reduced by the increased flow of cold air therethrough the liquid within reservoir 42 contracts, withdrawing the liquid front within tube 41 to a lower temperature region of insulated wall 21. The lower temperature existing at the new liquid front location causes condensation of a portion of the vapor of fluid 83 and a corresponding decrease in the pressure within bellows 65. Spring 71 therefore collapses bellows 65 a corresponding amount and retracts rod 77 closing damper 36.

Thermostatic device 37 may be adjusted to maintain a different temperature within food storage section 31 by turning knob 53 which acts through nut 52 and stud 51 to deform flexible diaphragm 44 forming one wall of reservoir 42. Flexing of diaphragm 44 varies the volume of reservoir 42 and, hence, changes the position of the liquid front in tube 41 with respect to insulated wall 21. To decrease the temperature of food storage section 31, the user need only turn knob 53 a small amount in one direction to force diaphragm 44 toward the interior of reservoir 42. The liquid front moves to a higher temperature region of tube 41 and the resulting increase in vapor pressure acting within bellows 65 expands the bellows and opens damper 36. The opening of damper 36 permits an increased flow of cold air through food storage section 31 and lowers the temperature thereof. Turning knob 53 in the opposite direction has the effect of lowering the temperature within food storage section 31.

*Modifications*

Figure 3:
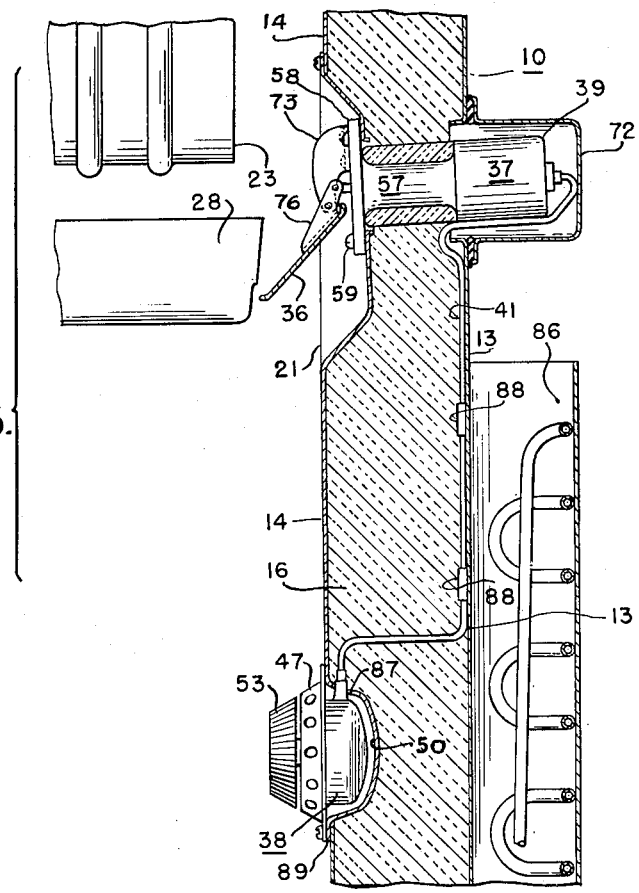
Fig. 3 is a view showing a modified mounting arrangement of the thermostatic means of this invention.

Fig. 3 of the drawings illustrates a modification of the invention in which means are provided for increasing the temperature gradient through the cabinet wall housing the thermostat 37. Like reference numerals have been employed to indicate elements of the invention identical to elements of the previously described embodiment.

Most conventional domestic refrigerators employ a mechanical compressor, condenser, expander refrigerating circuit. Since the construction and operation of circuits of this type are well known and understood by persons familiar with the refrigeration art, no detailed description thereof is deemed necessary here. Fig. 3 illustrates a portion of a refrigerator employing such a circuit in which the condensing or heat dissipating portion of the circuit takes the form of a plate type condenser 86 mounted on the outer shell 13 of rear wall 21 of the cabinet 10.

During operation of the refrigerating machinery, heat from condenser 86 is conducted to the cabinet outer shell 13 increasing the temperature gradient through wall 21. It will be apparent that with a wider range of temperatures available through which the liquid front within tube 41 can move, a wider range of vapor pressure will be available to operate motor element 39. In the refrigerator construction shown in Fig. 3, elongated tube 41 extends from temperature sensitive element 38 through an opening 87 provided therefor in inner liner 14 and passes in heat exchange relationship with the cabinet outer shell 13 and condenser 86. The tube 41 may, if desired, be secured to shell 13 and condenser 86 by means of clamps 88 to increase the conduction of heat thereto. To facilitate assembly of thermostat 37 into the refrigerator cabinet 10, the inner liner 14 may be provided with a removable section 89 to which is attached both the temperature sensitive element 38 and the insulated collar 57 which supports the motor element 39 and damper 36.

It will readily be understood that means other than the condenser 86 may be employed to add heat to shell 13 adjacent tube 41 for the purpose of increasing the temperature gradient through which the liquid front within tube 41 moves. Though not shown, an electric heater might be employed for this purpose.

Figure 4:
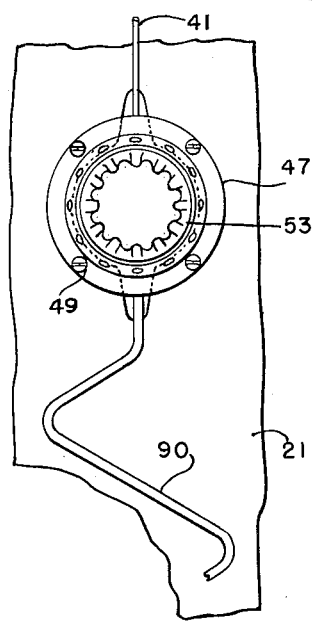
Figs. 4 and 5 illustrate a further modification of the invention.
Figure 5:
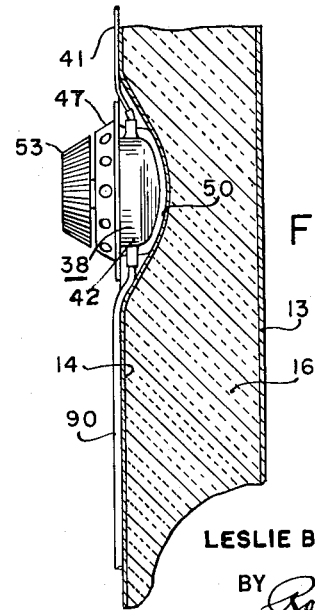

Figs. 4 and 5 illustrate a further modification of the invention which renders the thermostat 37 responsive to the average temperature within food storage section 31. In this embodiment reservoir 42 of temperature sensitive element 38 is provided with an elongated tubular portion 90 which lies against liner 14 of wall 21 and is arranged to extend through a number of temperature regions within food storage section 31. As in previously described embodiments, thermostat 37 is charged with a volatile fluid in such a manner as to insure that reservoir 42, including tubular portion 90 contains liquid. Since the liquid at various points along tube 90 will expand and contract in proportion to temperature changes at each point, the overall change in volume of liquid and the position of the liquid front within tube 41 will be proportional to the average variation of the various temperatures existing within food storage section 31. As is apparent, uniform results are best obtained by making tube 90 of uniform cross section throughout its length and the volume thereof large as compared to the volume of the cup-shaped portion of reservoir 42.

While I have shown my invention in several forms, it will be obvious to those skilled in the art that it is not so limited, but is susceptible of various other changes and modifications without departing from the spirit thereof.

What is claimed is:

1. In refrigeration apparatus, the combination of a cabinet having insulated walls enclosing a chamber, means for refrigerating media in said chamber and including a device for controlling the temperature within the chamber and thermostatic means for actuating the control device; said thermostatic means including a reservoir for volatile fluid, means including a bellows for actuating said control device, said bellows being disposed exteriorly of said chamber, an elongated tube providing communication between said reservoir and said bellows, and a charge of volatile fluid contained within the reservoir, tube and bellows, said reservoir being in heat transfer relation with the media in said chamber and said tube extending from the reservoir through the insulated wall of the cabinet to said bellows, the quantity of fluid in liquid form in said charge being sufficient to fill the reservoir and the portion of the tube within the chamber when the temperature of the media in the chamber is at the minimum value to be maintained and the flow area of the tube being such that expansion of the liquid in the reservoir in response to a predetermind rise in temperature thereof forces the front surface of the liquid to a higher temperature region of the tube, the construction and arrangement being such that the pressure of the fluid as determined by the temperature of said front surface thereof varies throughout a relatively wide range in response to relatively small changes in temperature of the fluid contained within the reservoir.

2. In refrigeration apparatus, the combination with an insulated wall structure having one side thereof subjected to a refrigerated media and the other side thereof to the ambient atmosphere whereby a temperature gradient exists within said wall structure from the outside to the inside thereof; of a control device for regulating the temperature of said refrigerated media and thermostatic means for actuating the control device, said thermostatic means including a reservoir containing a volatile fluid and arranged in heat transfer relation with the refrigerated media on one side of said wall; a bellows disposed in heat transfer relation with the ambient atmosphere on the other side of said wall; means attached to said bellows and extending through said wall for actuating said control device and an elongated tube extending through said insulated wall and providing communication between said reservoir and said bellows; the quantity of volatile fluid in liquid form in said thermostatic means being sufficient to fill the reservoir and a portion of said tube in heat transfer relation with said refrigerated media when the temperature of said media is at the minimum value to be maintained; the flow area of said tube being such that expansion of the liquid in the reservoir in response to a predetermined rise in temperature of the refrigerated media forces the front surface of the liquid in said tube to a predetermined higher temperature region of the tube as determined by the temperature gradient through said insulated wall; the construction and arrangement being such that the pressure of the fluid acting on said bellows as determined by the temperature of the front surface of the liquid phase thereof varies throughout a relatively wide range in response to relatively small changes in temperature of the fluid contained within the reservoir.

3. Refrigeration apparatus as set forth in claim 2 including means for adding heat to the other side of said insulated wall adjacent said elongated tube for increasing the temperature gradient through said wall.

4. Refrigeration apparatus as set forth in claim 2 in which said reservoir has an elongated, liquid filled portion thereof arranged in heat transfer relation with a plurality of regions of the refrigerated media whereby the position of the liquid front in said elongated tube is varied in response to changes in temperature of said regions of the refrigerated media.

5. In refrigeration apparatus, the combination of a cabinet having insulated walls enclosing a chamber; means for refrigerating media in said chamber, said refrigerating means including a heat absorbing unit disposed within said chamber, a heat dissipating unit disposed exteriorly of said chamber and attached to one of the walls of said cabinet, means for circulating refrigerant between said heat absorbing and heat dissipating units and a device disposed within said chamber for controlling the temperature in the chamber; and thermostatic means for actuating said control device, said thermostatic means including a reservoir for volatile fluid arranged in heat transfer relation with the refrigerated media in said chamber, a bellows disposed exteriorly of said cabinet, means attached to said bellows and extending through one of the walls of said cabinet for actuating said control device, an elongated tube providing communication between said reservoir and said bellows, said tube extending through one of the insulated walls of said cabinet and having a portion thereof arranged in heat transfer relation with said heat dissipating unit; and a quantity of volatile fluid contained within said thermostatic means sufficient to fill said reservoir and a portion of said tube within the refrigerated chamber with liquid when the temperature of the media in said chamber is at a minimum value to be maintained.

6. Refrigeration apparatus as set forth in claim 5 in which said reservoir has an elongated, liquid filled portion thereof arranged in heat transfer relation with a plurality of regions of the refrigerated media whereby the position of the liquid front in said elongated tube is varied in response to changes in the average temperature of said regions of the refrigerated media.

7. In refrigeration apparatus, the combination of a cabinet having insulated walls enclosing a chamber, one of said insulated walls having an opening therein; means for refrigerating media in said chamber including a device for controlling the temperature in the chamber; thermostatic means for actuating said control device and including a reservoir containing volatile fluid and disposed in heat transfer relationship with the media in said chamber, a bellows and an elongated tube providing communication between said reservoir and said bellows; a collar member having low heat conducting properties; means for securing said control device to one end of said collar member; means for securing said bellows to the other end of said collar member; and a motion transmitting member disposed within said collar member and attached at one end to said bellows and at its other end to said control device; said collar member and a portion of said elongated tube being disposed in the opening in said insulated wall whereby said bellows assembly is disposed outside said cabinet.

8. In refrigeration apparatus, the combination of a cabinet having insulated walls enclosing a chamber, one of said walls having an opening therein; means for refrigerating media in said chamber; a movable damper arranged to regulate the circulation of air within the chamber; thermostatic means for actuating said damper, said thermostatic means including a reservoir containing volatile fluid and disposed in heat transfer relationship with the media in said chamber, a bellows and an elongated tube providing communication between said reservoir and said bellows; a collar member of low heat conducting material disposed within the opening in the cabinet wall; means for supporting said movable damper on one end of said collar member within said chamber; means attaching said bellows to the other end of said collar member exteriorly of said chamber; and an actuating rod disposed within said collar member and attached at one end to said movable damper and at its other end to said bellows.

References Cited in the file of this patent

UNITED STATES PATENTS

| | | |
|---|---|---|
| 1,425,189 | Fitts | Aug. 8, 1922 |
| 2,346,287 | Borgerd | Apr. 11, 1944 |
| 2,480,617 | Tobey | Aug. 30, 1949 |
| 2,546,363 | Jaeger | Mar. 27, 1951 |